United States Patent
Summer et al.

(10) Patent No.: US 8,504,205 B2
(45) Date of Patent: Aug. 6, 2013

(54) ROBOTIC GRASPING DEVICE WITH MULTI-FORCE SENSING AT BASE OF FINGERS

(75) Inventors: Matthew D. Summer, Melbourne, FL (US); Paul M. Bosscher, West Melbourne, FL (US); Loran J. Wilkinson, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 210 days.

(21) Appl. No.: 13/049,982

(22) Filed: Mar. 17, 2011

(65) Prior Publication Data
US 2012/0239195 A1 Sep. 20, 2012

(51) Int. Cl.
*G05B 15/00* (2006.01)
*G05B 19/00* (2006.01)

(52) U.S. Cl.
USPC ............... 700/260; 700/258; 901/34; 901/46

(58) Field of Classification Search
USPC ......... 700/258, 260; 901/34, 46; 73/862.381
See application file for complete search history.

(56) References Cited

U.S. PATENT DOCUMENTS

| | | | |
|---|---|---|---|
| 898,702 A | 9/1908 | Taylor | |
| 975,891 A | 11/1910 | Prellwitz | |
| 2,825,436 A | 3/1958 | Amtsberg | |
| 3,370,213 A | 2/1968 | Rose | |
| 4,114,464 A | 9/1978 | Schubert et al. | |
| 4,132,318 A | 1/1979 | Wang et al. | |
| 4,149,278 A | 4/1979 | Frosch et al. | |
| 4,544,193 A | 10/1985 | Dunn et al. | |
| 4,572,564 A | 2/1986 | Cipolla | |
| 4,579,380 A | 4/1986 | Zaremsky et al. | |

(Continued)

FOREIGN PATENT DOCUMENTS

| | | |
|---|---|---|
| DE | 10 2008 042261 A1 | 4/2010 |
| EP | 1 507 259 A1 | 2/2005 |
| JP | 11 320473 A | 11/1999 |
| WO | 2010 040215 A1 | 4/2010 |

OTHER PUBLICATIONS

International Search Report mailed Jun. 21, 2012 in Application Serial No. PCT/US2012/027469 in the name of Harris Corporation.

(Continued)

*Primary Examiner* — Khoi Tran
*Assistant Examiner* — Robert Nguyen
(74) *Attorney, Agent, or Firm* — Fox Rothschild, LLP; Robert J. Sacco

(57) ABSTRACT

A robotic grasping device (10) has a first finger (20), a second finger (30) and an actuator (40). The first finger has a first fingertip (22), a first base (24) and a first actuator engagement end (26). A first gripping surface (21) of the first finger lies between the first fingertip and the first base. Similarly, the second finger has a second fingertip (32), a second base (34), a second actuator engagement end (36). A second gripping surface (31) of the second finger is between the second fingertip and the second base. The actuator (40) mechanically engages with the first actuator engagement end and the second actuator engagement end to open and close the fingers. A first force sensor (28) is disposed on the base of the first finger to measure a first operative force on the first finger, and a second force sensor (38) is disposed on the base of the second finger to measure a second operative force on the second finger.

24 Claims, 6 Drawing Sheets

U.S. PATENT DOCUMENTS

| | | |
|---|---|---|
| 4,600,357 A | 7/1986 | Coules |
| 4,609,220 A | 9/1986 | Scott |
| 4,653,793 A | 3/1987 | Guinot et al. |
| 4,680,523 A | 7/1987 | Goumas et al. |
| 4,770,455 A | 9/1988 | Collins, Jr. |
| 4,841,832 A | 6/1989 | Snavely et al. |
| 5,011,207 A | 4/1991 | Stevens |
| 5,092,645 A | 3/1992 | Okada |
| 5,280,981 A | 1/1994 | Schulz |
| 5,403,057 A | 4/1995 | Sugito et al. |
| 5,407,185 A | 4/1995 | Zehnpfennig et al. |
| 5,992,538 A | 11/1999 | Marcengill et al. |
| 6,217,094 B1 | 4/2001 | Hanaduka et al. |
| 6,377,011 B1 * | 4/2002 | Ben-Ur ................. 318/566 |
| D466,780 S | 12/2002 | Stirm |
| 7,014,235 B1 | 3/2006 | Ostwald |
| 7,125,010 B2 | 10/2006 | Moore et al. |
| 7,168,748 B2 | 1/2007 | Townsend et al. |
| 7,370,896 B2 | 5/2008 | Anderson et al. |
| 7,513,546 B2 | 4/2009 | Vranish |
| 2009/0014193 A1 | 1/2009 | Barezzani et al. |
| 2010/0156127 A1 | 6/2010 | De Kervanoael |

OTHER PUBLICATIONS

Information about Related Patents and Patent Applications, see section 6 of the accompanying Information Disclosure Statement Letter, which concerns Related Patents and Patent Applications.

International Search Report mailed Dec. 20, 2012 in International Application Serila No. PCT/US2012/049214, in the name of Harris Corporation.

* cited by examiner

ROBOTIC GRASPING DEVICE WITH MULTI-FORCE SENSING AT BASE OF FINGERS

STATEMENT OF THE TECHNICAL FIELD

The inventive arrangements relate generally to robotic grasping devices. More particularly, the invention concerns robotic grasping devices that have improved sensing capability for haptic feedback systems.

DESCRIPTION OF THE RELATED ART

Remotely controlled robotic systems are growing increasingly common for use in areas in which a human can be subjected to dangerous or otherwise unpleasant work environments. One important component of a robotic system is a grasping device or gripper used to grasp objects that are to be lifted, moved or otherwise manipulated. Typical grasping devices include one or more robot fingers that can be moved by an actuator to effect such grasping operations. A user interface is provided to permit an operator to control the movement of the robot fingers.

Some robot systems include haptic interfaces that rely on sensor data from the robot to generate haptic feedback forces at the user interface. The haptic feedback forces are intended to provide the user with tactile feedback that is useful for controlling the operation of the robot system. For example, in the case of a grasping device, sensors can measure the force applied by robot fingers to an object. This force information is communicated to a control system, where it is used to determine haptic feedback forces to be asserted at the user interface.

Some grasping devices estimate forces applied by robot fingers by measuring the actuator effort. Such a system is disclosed for example in U.S. Pat. No. 7,168,748. One problem with such an arrangement, however, is that it does not sense the direction of applied forces. Other systems, such as that disclosed in U.S. Pat. No. 5,092,645 provide tactile pads on the robot fingers to measure force applied by the robot fingers.

SUMMARY OF THE INVENTION

The invention concerns a robotic grasping device and a method for measuring force applied to a robotic grasping device. A grasping device includes at least first and second robot fingers, each having an elongated form. Each of the robot fingers has a proximal end where it engages an actuator, and a distal end that includes a gripping surface. The actuator is responsive to one or more control signals for applying an actuator force which moves the robot fingers in accordance with a grasping action. For example, the grasping action can reduce a space between opposing first and second gripping surfaces. A first force sensor is disposed on a first robot finger between the proximal end and the distal end, adjacent to the proximal end. The first force sensor is configured for sensing an operative force applied to the distal end of first robot finger. In some embodiments, the first force sensor is configured for sensing the operative force with respect to at least three spatial directions. At least one of the spatial directions can be substantially aligned with an elongated length of the first robot finger.

A second force sensor is disposed on the second robot finger between the proximal end and the distal end, adjacent to the proximal end. In such an embodiment, the first force sensor and the second force sensor respectively sense a first and second operative force applied to the first and second robot finger. According to one aspect of the invention, these forces are measured by each of the first and second force sensor in at least three spatial directions. More particularly, the first force sensor senses the first operative force with respect to a first coordinate system, and the second force sensor senses the second operative force with respect to a different, second coordinate system. At least one axis of the first coordinate system is substantially aligned with an elongated length of the first finger. At least one axis of the second coordinate system is substantially aligned with an elongated length of the second finger.

The information from the first and second sensors is communicated to a data processing system. The data processing system uses data representing the first and the second operative force to determine a gripping force applied by the grasping device. The gripping force information is used to generate a haptic feedback control signal for producing a haptic response at a user interface. The data processing system can translate the first operative force (of the first coordinate system) and the second operative force (of the second coordinate system), to a common third coordinate system. Accordingly, if the grasping device is attached to a robotic arm, a working force on a robotic arm can be determined. The third coordinate system can include an axis that is substantially aligned with an elongated length of the robotic arm. The data processing system can use the working force information to generate a further haptic feedback control signal for producing a haptic response at a user interface.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
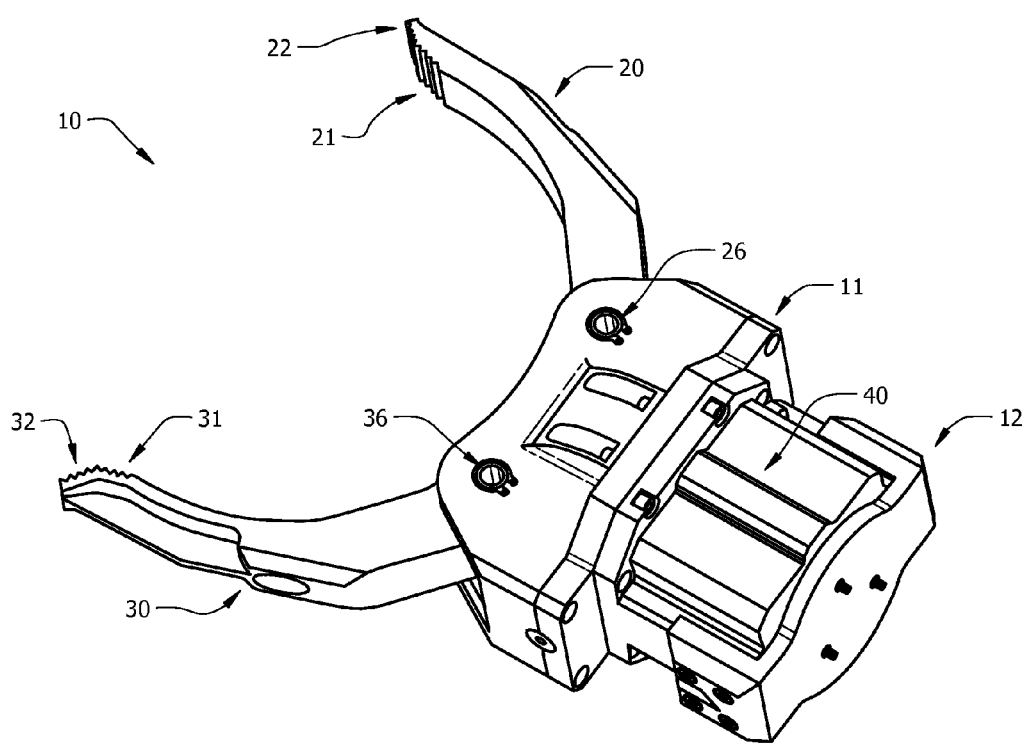
FIG. 1 is a perspective view of an embodiment of a robotic grasping device.

The various embodiments of the present invention are described with reference to the attached figures, wherein like reference numbers are used throughout the figures to designate similar or equivalent elements. The figures are not drawn to scale and they are provided merely to illustrate the embodiments of the present invention. Several aspects of the invention are described below with reference to example applications for illustration. It should be understood that numerous specific details, relationships, and methods are set forth to provide a full understanding of the invention. One having ordinary skill(s) in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts can occur in different orders and/or concurrently with other acts or events. Furthermore, not all illustrated acts or events are required to implement a methodology in accordance with the present invention.

The present invention concerns robotic grasping devices with one or more robot fingers. More particularly, the invention concerns multi-axis force-sensing at the base of the robot fingers. The multi-axis force sensing provides a way to determine the operative force on each robot finger. Preferably the operative force measurement includes measuring a force on a robot finger in at least three spatial directions, which spatial directions can be defined with respect to a coordinate system relative to that finger. As a result, all contact forces on the robot finger can be measured including reactive forces (produced by gripping), external forces on the fingertips (such as by brushing or striking a surface), the weight of the object being gripped, and so on. Further, this force sensing does not require actuator effort sensing, or the measuring of forces at the base (wrist) of the grasping device itself. Placing the sensors at the base of the fingers avoids sensing problems caused by vibration, heavy grasping devices or both which can produce noise in conventional force/torque sensors outputs. In particular, such noise can result when the sensor is located in a conventional location, such as a robot arm to which the grasping device is attached. Placing the sensors at the base of the fingers avoids this problem, thereby providing low-noise data.

The low-noise operative finger force data can be transformed into a format most meaningful for the application at hand. For example, whole hand gripping forces can be computed, the working force on the actuator arm can be computed, and the forces with respect to the base of the robotic grasping device can also be computed. These computed force values can be translated into higher-fidelity haptic feedback for the operator to ensure precise control of the robotic grasping device. Haptic information is computed using the operative force data to provide force feedback information about the gripping strength of the fingers and the working force on the arm.

FIG. 1 is a perspective view of a robotic grasping device 10. The grasping device 10 comprises a first finger 20 and a second finger 30. One or both fingers can be coupled to an actuator 40 that is housed in the gripper base 11 which connects to the robotic arm 12 that supports the robotic grasping device 10. Although only two fingers 20, 30 are shown it will be understood that additional fingers can be provided. Each finger 20, 30 comprises an actuator engagement end 26, 36 located at a respective proximal end of each finger 20, 30, a finger base 24, 34 also at the proximal end of each finger, and a fingertip 22, 32 at a distal end of each finger. A gripping surface 21, 31 of each finger 20, 30 is disposed between the respective fingertip 22, 32 and base 24, 34. Force sensors 28, 38 are provided between the actuator engagement end 26, 36 and the gripping surface 21, 31.

The actuator 40 is mechanically coupled to each of the actuator engagement ends 26, 36 to facilitate the opening and closing of the grasping device 10. In response to certain control signals, the actuator 40 is configured to cause the fingertips 22, 32 to move towards and away from each other when the actuator 40 manipulates the actuator engagement ends 26, 36.

The actuator 40 can include one or more DC motors (not shown) for providing a driving force to move the fingers 20, 30. Suitable control circuitry can also be provided for operating the DC motors. The motors can be coupled to a transmission system comprising gears, cams or other suitable components to facilitate causing fingers 20, 30 to move toward each other or away from each other in response to rotation of a motor shaft. Still, the invention is not limited in this regard and other actuator arrangements are also possible. For example, rather than using a DC motor, the actuator can include one or more hydraulic or pneumatic actuators to provide the motivating force for driving the fingers 20, 30. Still, it should be understood that the invention is not limited to any particular actuator arrangement. Instead, any suitable mechanical, electro-mechanical, hydraulic, pneumatic, or the like arrangement can be made for effecting grasping movement of the robot fingers.

Figure 2A:
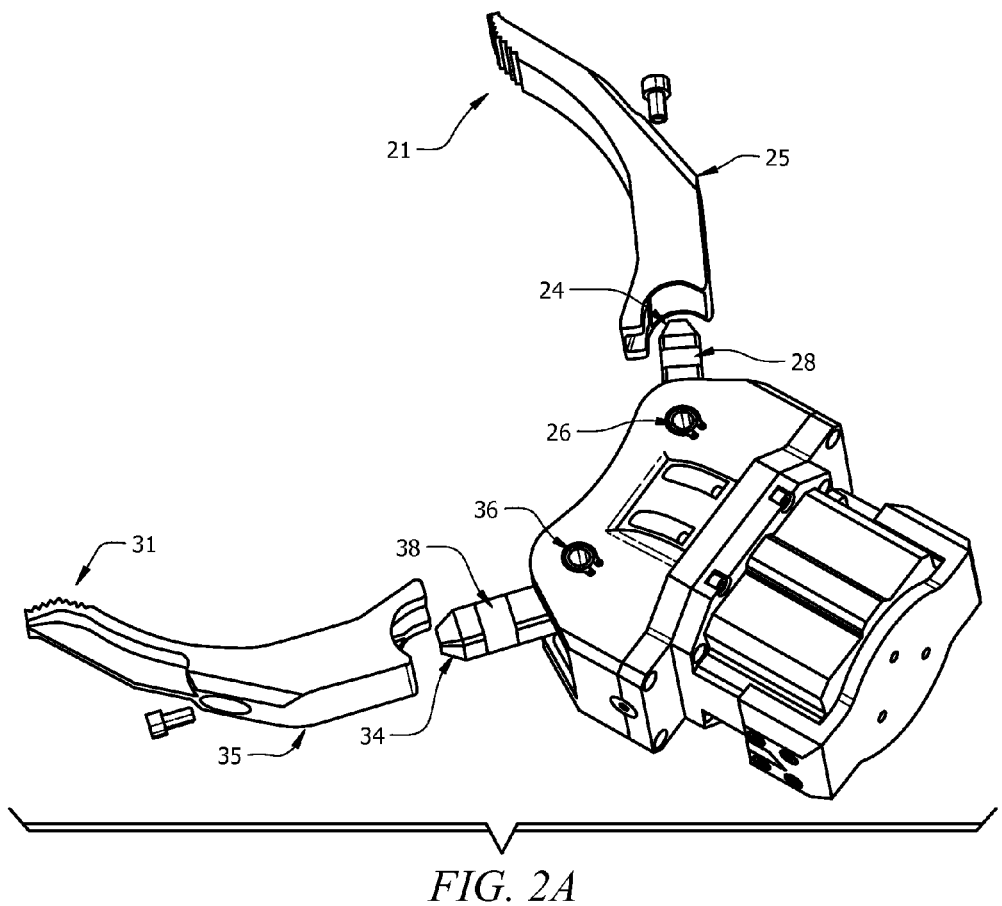
FIG. 2A is a perspective view of the embodiment of a robotic grasping device shown in FIG. 1 with fingers removed to illustrate finger bases and locations of force sensors.
Figure 2B:
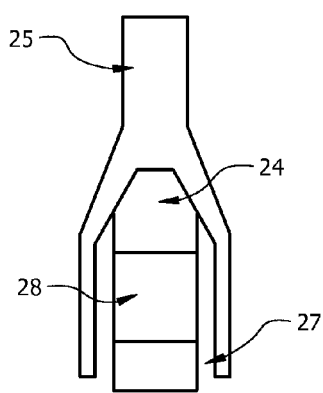
FIG. 2B is a detailed view of a portion of FIG. 2A encircled with a dotted line.
Figure 3:
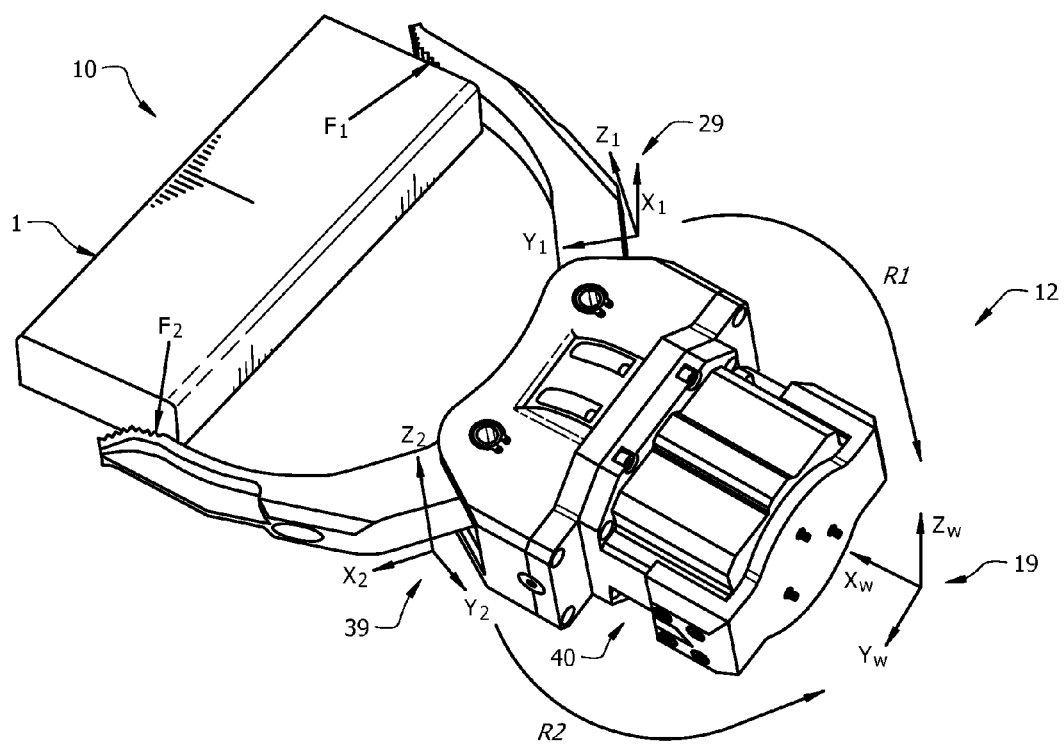
FIG. 3 is a perspective view of the embodiment of a robotic grasping device shown in FIG. 1, illustrating force diagrams for the various components of the robotic grasping device.

Referring now to FIG. 2A, FIG. 2B and FIG. 3, the first force sensor 28 measures a first operative force $F_1$ experienced by the first finger 20, while the second force sensor 38 measures a second operative force $F_2$ experienced by the second finger 30. Operative force measurement can include measuring a force on a finger in one, two or three spatial directions. The spatial directions can be defined with respect to a coordinate system relative to that finger. For example, one axis of a coordinate system can be substantially aligned with an axis extending along an elongated length of each finger.

In some embodiments, it may be necessary to use more than one force sensor in each finger to perform force measurement in three spatial directions. Accordingly, a force sensor 28 can actually be comprised of two or more individual force sensors. Similarly, force sensor 38 can also comprise two or more individual force sensors for purposes of measuring a force on a finger in at least three spatial directions.

In some embodiments the force sensors 28, 38 of each finger can be located between the base 24, 34 and the useful gripping surface 21, 31 of each finger. In other embodiments, the force sensors 28, 38 can form a portion of the base 24, 34 of the finger. In a preferred embodiment of the invention, each force sensor 28, 38 can be, for example, a force measuring unit that is physically disposed on a finger base 24, 34. The finger grippers 25, 35, which provide the respective gripping surfaces 21, 31 of each finger 20, 30, are rigidly attached to the finger bases 24, 34. In some embodiments the force sensors 28, 38 are implemented as strain gages bonded to the surface of the finger bases 24, 34. In order to obtain sufficient bend in the finger bases when forces are applied to the fingers, the finger bases 24, 34 are preferably thin-walled structures as is typical in force-sensing applications. Due to the fragile nature of strain gages, it is preferable for the finger grippers 25, 35 to slide over and to fully cover the finger bases 24, 34 when they are attached in order to protect the force sensors 28, 38 from damage as shown in FIG. 2B. It is also desirable that there be an air gap 27 between the finger gripper 25 and finger base 24 such that the finger gripper 25 does not contact the finger base 24 (other than at the attachment end) as the finger base 24 flexes due to forces F1 and F2. The electrical connections of the strain gages 28, 38 are connected to electronics within the gripper base 11 which performs the necessary signal conditioning and processing to produce the measurements of finger contact forces F1 and F2.

Referring once again to FIG. 3, there is provided a perspective view of the robotic grasping device 10 illustrating force diagrams for the various components of the operative forces. The forces shown arise when the actuator 40 causes the fingers 20, 30 to close upon an object 1. More particularly, when the fingers 20, 30 close upon an object 1, the force exerted by the fingers 20, 30 upon the object 1 will produce corresponding reactive forces $F_{1R}$ and $F_{2R}$ that are imparted upon the fingers 20, 30, respectively. Other forces may also act upon the fingers 20, 30. For example, an object grasped by the fingers 20, 30 will have some weight and the weight will result in a force being imparted upon the fingers 20, 30. Also, the fingers 20, 30 can in some instances contact or move through objects or materials that create resistance and drag forces which operate on the fingers 20, 30. Collectively, such forces will produce an operative force $F_1$ imparted upon first finger 20 which is detected by first force sensor 28. Similarly, an operative force $F_2$ will be imparted upon second finger 30, and such force will be detected by second force sensor 38.

Each sensor 28, 38 can employ a respective first and second reference frame 29, 39, and the operative force $F_1$, $F_2$ upon each finger 20, 30 as detected by the sensor 28, 38 can be decomposed into corresponding force component vectors in that reference frame 29, 39. Hence, first force $F_1$ experienced by the first finger 20 can be decomposed into three corresponding first force component vectors $F_{x1}$, $F_{y1}$, $F_{z1}$ in the first reference frame $x_1$, $y_1$, $z_1$ 29 by first sensor 28, and second force $F_2$ experienced by the second finger 30 can be decomposed into three corresponding force component vectors $F_{x2}$, $F_{y2}$, $F_{z2}$ in the second reference frame $x_2$, $y_2$, $z_2$ 39 by second sensor 38.

In some embodiments of the invention, each of the first and second reference frames 29, 39 is defined, and each sensor 28, 38 oriented, for example, with reference to a vector (not shown) that substantially extends along the long axis of the finger base 24, 34. Such vector can define the direction of an x axis aligned with the x component of the operative force detected by the sensor 28, 38. Those skilled in the art will appreciate that the x axis in some embodiments can be selected to be any arbitrary direction. The z component of the operative force vector can be defined with reference to a z axis extending from the top surface of the finger 20, 30, and orthogonal to x component. The y component can be aligned with a y axis defined to create a right-handed coordinate system with respect to the x and z axes. Of course, any other method can be employed to define the respective first and second reference frame 29, 39 of each finger 20, 30 and the foregoing examples are simply illustrative.

Each force sensor 28, 38 can transmit operative force data corresponding to the operative force $F_1$, $F_2$ measured by the sensor 28, 38 to actuator processing circuitry. In some embodiments, the actuator processing circuitry can be contained in the robotic grasping device 10. Alternatively, the actuator processing circuitry can be disposed within the robotic arm 12, or in an unmanned ground vehicle (UGV) to which the robotic arm 12 is attached, or a remote control processor unit. Alternatively, actuator processing circuitry can be distributed in several such locations. Of course, any suitable method can be employed to transmit information concerning the operative forces $F_1$, $F_2$, to such actuator processing circuitry. For example, analog signals employing voltage or current, or digital signals can be used for this purpose. In some embodiments, first force sensor 28 can transmit first operative force data (encoding the three force vector components $F_{x1}$, $F_{y1}$, $F_{z1}$ of the operative force $F_1$) to the actuator processing circuitry by way of a robotic arm interface. Similarly, second force sensor 38 can transmit second operative force data (encoding the three force vector components $F_{x2}$, $F_{y2}$, $F_{z2}$ of the operative force $F_2$) to the actuator processing circuitry by way of the interface. This interface can be any suitable electrical, optical, or electro-optical interface suitable for communicating analog or digital data.

In some embodiments of the invention, the vector data defining operative force $F_1$ ($F_{x1}$, $F_{y1}$, $F_{z1}$) and $F_2$ ($F_{x2}$, $F_{y2}$, $F_{z2}$) generated by the respective force sensors 28, 38 can be processed to be expressed as $F_{1w}$ and $F_{2w}$, respectively, in a third reference frame ($x_w$, $y_w$, $z_w$), namely working reference frame 19. This processing can be performed by the actuator processing circuitry described above. Then if R1 is a rotation matrix that maps vectors from $x_1$, $y_1$, $z_1$ 29 to the working reference frame $x_w$, $y_w$, $z_w$ 19, and if R2 is a rotation matrix that maps vectors from $x_2$, $y_2$, $z_2$ 39 to the working reference frame $x_w$, $y_w$, $z_w$ 19, $F_{1w}$ and $F_{2w}$ are given by:

$$F_{1w} = R1 \cdot \begin{bmatrix} F_{x1} \\ F_{y1} \\ F_{z1} \end{bmatrix} \quad F_{2w} = R2 \cdot \begin{bmatrix} F_{x2} \\ F_{y2} \\ F_{z2} \end{bmatrix}$$

Rotation matrices R1 and R2 are 3×3 matrices, and construction of them is well known in the art. Construction of these rotation matrices can be based upon measurement of the angles of the finger bases with respect to the gripper base, thus it is may be desirable to have some sensor or other method of determining the rotation of the fingers (should they rotate as the fingers open and close). The actuator processing circuitry can include one or more microprocessors and memory storing program code executable by the microprocessors to provide desired steps to control the actuator 40. As such the actuator processing circuitry can control one or more motors that drive the positions of the fingers 20, 30 and determine the positions of each finger 20, 30. The circuitry can include hardware, software or both to measure the position, such as angular deflection, of each finger 20, 30. This can be done by any suitable method as known in the art, such as by utilizing hardware that develops signals according to the actual position of each finger 20, 30, or by using software that tracks the position of each finger 20, 30 by measuring, for example, how long the motor or motors driving the fingers 20, 30 have been active, and the direction of motion. Based upon the finger 20, 30 position information determined by the actuator processing circuitry, the circuitry can then generate corresponding rotation matrices R1 and R2 for the first finger 20 and second finger 30, respectively.

As noted above, each force sensor 28, 38 measures not only the reactive force $F_{1R}$, $F_{2R}$ respectively felt by each finger 20, 30 due to the gripper squeezing an object 1, but can detect other forces upon the finger 20, 30, such as a resistive force incurred by the finger 20, 30 dragging through or across a material, contacting an object, the weight of the object 1, etc. All of these forces create the operative force $F_1$, $F_2$ experienced by the finger 20, 30 as measured by the respective force sensor 28, 38. It is desirable to separate forces resulting from the gripper squeezing an object ($F_{grip}$) from all other forces acting on the fingers ($F_{contact}$). Note that the gripping force $F_{grip}$ can be expressed simply as a magnitude of the gripping force (without concern for absolute direction), while it may be desirable to preserve both the magnitude and the direction of the contact force $F_{contact}$. Gripping an object results in equal and opposite gripping forces on the fingers (when expressed in the working reference frame 19), thus $$F_{grip} = \left\| \frac{F_{1w} - F_{2w}}{2} \right\|$$

while the contact force represents the sum total of the forces acting on the fingers:

$$F_{contact} = F_{1w} + F_{2w}$$

Figure 4:
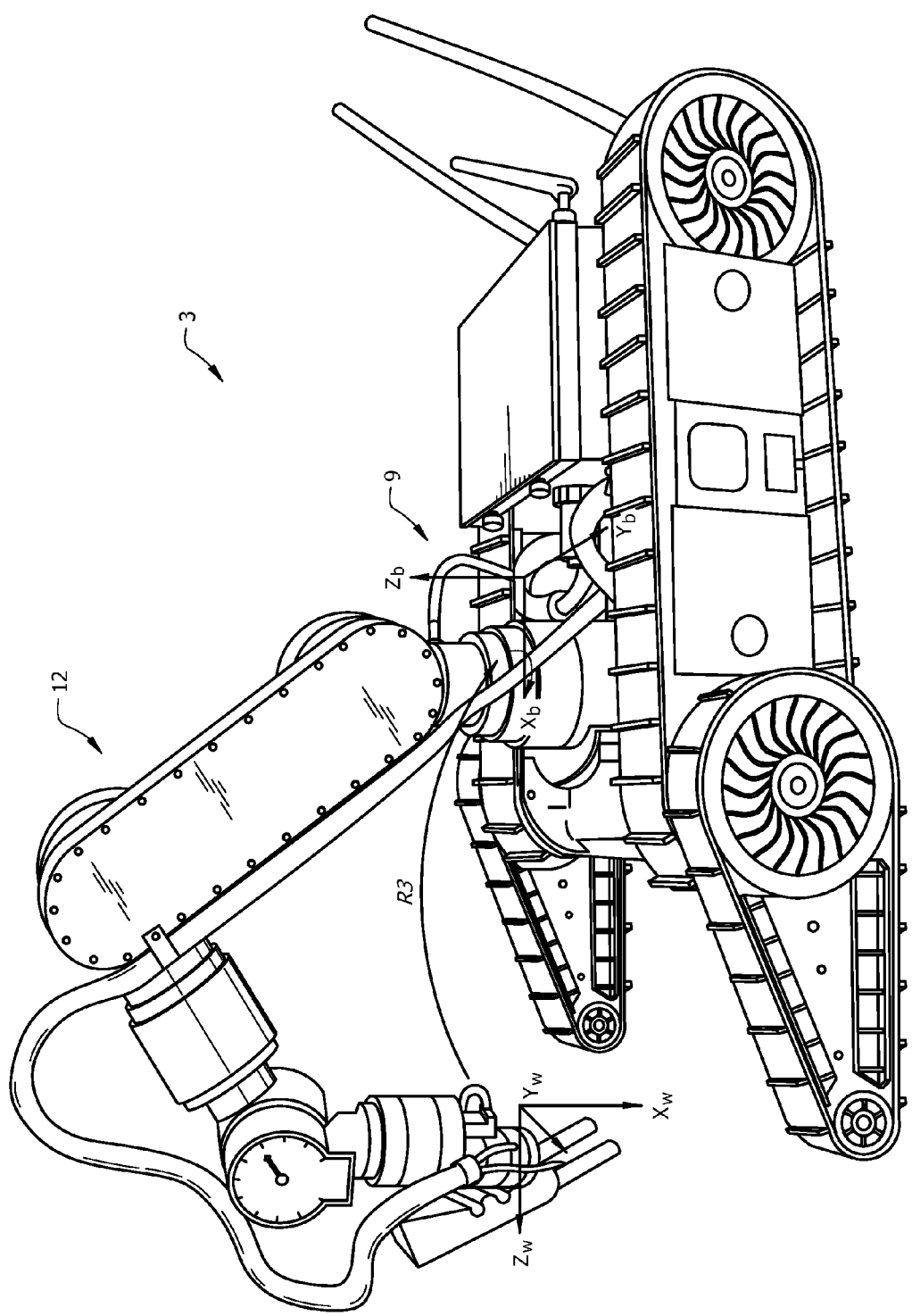
FIG. 4 illustrates an unmanned ground vehicle (UGV) employing a robotic grasping device shown FIG. 3.
Figure 5:
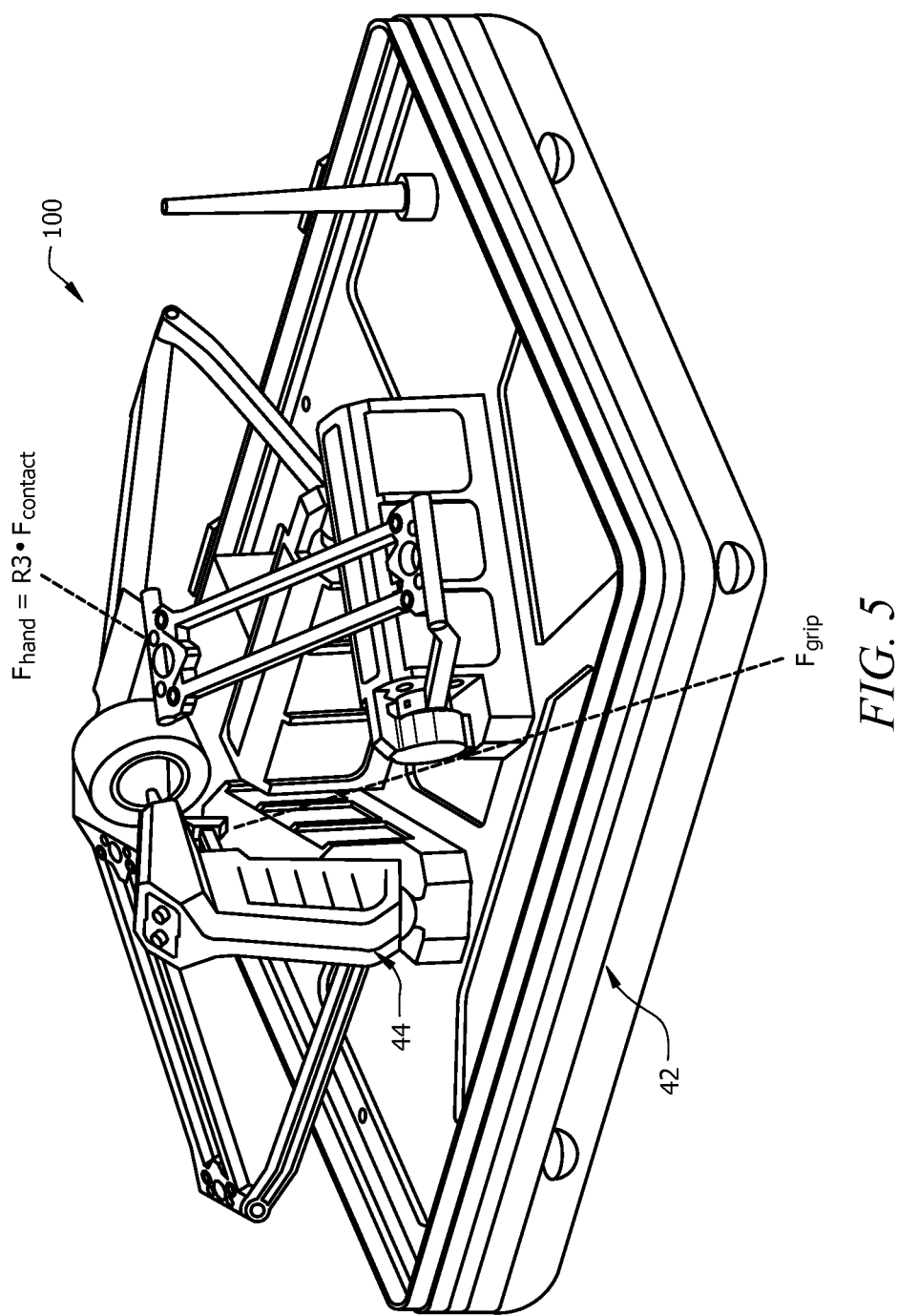
FIG. 5 illustrates a controller that employs haptic feedback data obtained from operative force data measured by the UGV of FIG. 4.

Similarly, with reference to FIG. 4 and FIG. 5, which illustrates a UGV 3 with the robotic arm 12 and a haptic device 100 for controlling the UGV 3, it is desirable for the contact force $F_{contact}$ to be applied to the operator's hand via a haptic device 100, which the operator feels as a force $F_{hand}$ that corresponds to $F_{contact}$. However, it is desirable for this force $F_{hand}$ to be consistent with the orientation of the UGV 3. Because the arm 12 can be oriented arbitrarily it is desirable to transform the contact force $F_{contact}$ into a hand force $F_{hand}$ that is expressed in the base frame $x_b$, $y_b$, $z_b$ 9 of the UGV 3. The hand force $F_{hand}$ is calculated by way of a suitable rotation matrix R3, using methods substantially similar to those discussed above.

Figure 6:
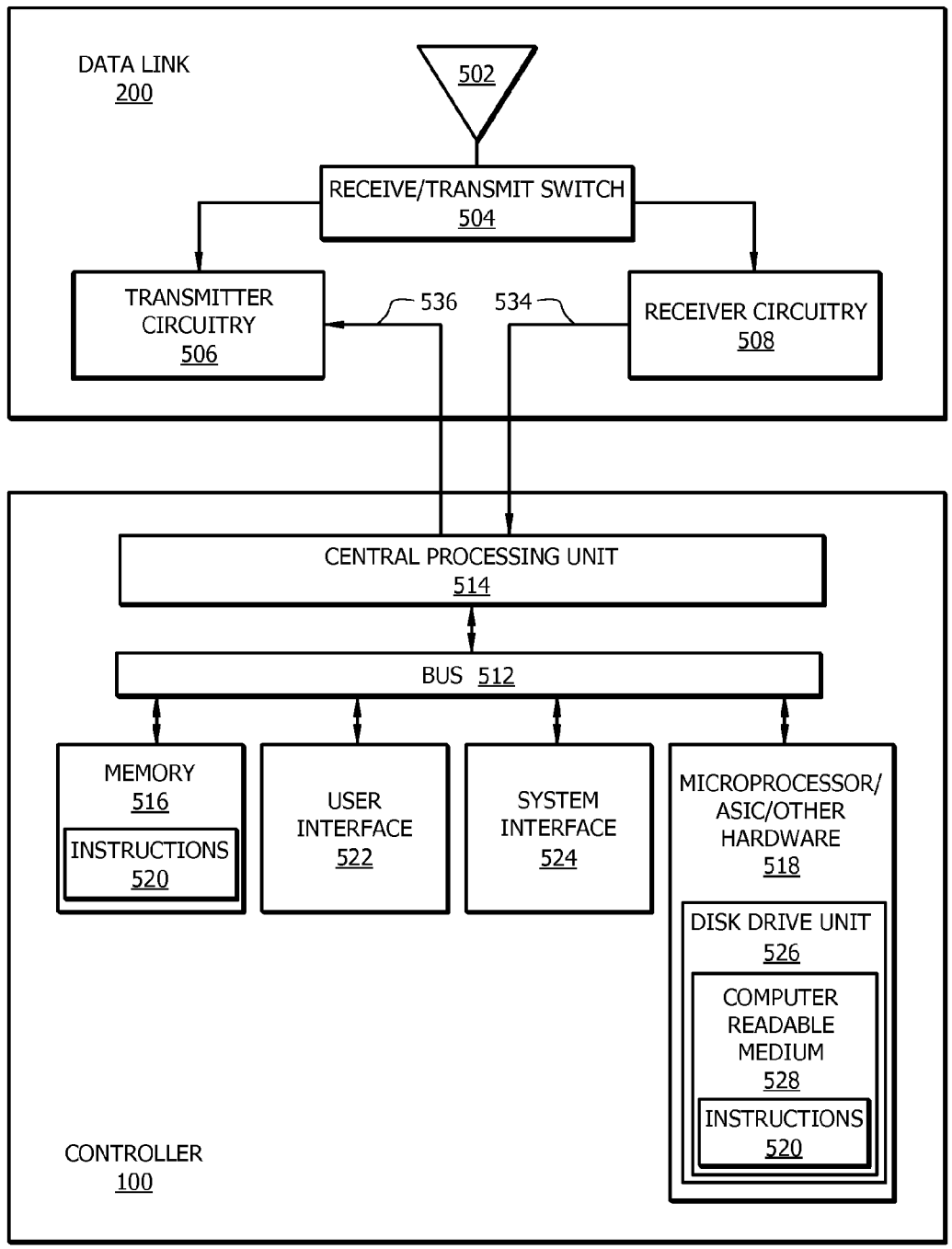
FIG. 6 is a detailed block diagram showing additional features of the controller.

As shown with reference to FIG. 5 and FIG. 6, the operative force data can be used to provide haptic feedback data for a controller 100 used by an operator to control the UGV 3. Controller 100 can include a user interface 522 in the form of a hand controller. The hand controller can include suitable hardware and software that is capable of sensing user hand inputs with as many as six degrees of freedom. For example, in some embodiments the user interface can include a hand grip 44 that is capable of six axis directional control of a robot arm (e.g. a three axis orthogonal linear coordinate system, and up to three orthogonal axes of rotation). Data link circuitry in the UGV can transmit telemetry information to robot control processing circuitry located in the base 42 of the controller 100. If wireless data link circuitry is used, then an antenna 502 can be provided in base 42 to facilitate data link communications. The telemetry information can include one or more of $F_1$, $F_2$, $F_{contact}$, $F_{grip}$, or combinations thereof, etc. This information can then be used to compute haptic feedback data to be applied by the controller 100 to the user interface 522. For example, one or more haptic actuators (not shown) can be provided in the base 42 for this purpose.

Referring specifically to FIG. 6, the various features of the controller 100 will now be described in further detail. The controller 100 can include a system interface 524, user interface 522, a Central Processing Unit (CPU) 514, a system bus 512, a memory 516 connected to and accessible by other portions of the controller 100 through system bus 512, and hardware entities 518 connected to system bus 512. System interface 524 allows the controller 100 to communicate directly with data link 200, network equipment and other data links via a wired communications link. At least some of the hardware entities 518 perform actions involving access to and use of memory 516, which can be a random access memory (RAM), a disk drive, and/or a compact disc read only memory (CD-ROM).

Hardware entities 518 can include microprocessors, application specific integrated circuits (ASICs) and other hardware. Hardware entities 518 can include a microprocessor programmed for facilitating the provision of data communication services and actuator sensing, force translation, and control processing as described herein. For example, the microprocessor can access and run actuator processing including force translation processing as described herein for translating forces from one reference frame 29, 39, 19, 9 to another reference frame 29, 39, 19, 9. Accordingly, the actuator processing circuitry can be comprised of hardware entities 518 in some embodiments. The communication operations can include, but are not limited to, signal receiving operations, signal processing operations, signal generation operations, and signal communication operations.

As shown in FIG. 6, the hardware entities 518 can include a disk drive unit 526 comprising a computer-readable storage medium 528 on which is stored one or more sets of instructions 520 (e.g., software code) configured to implement one or more of the methodologies, procedures, or functions described herein. The instructions 520 can also reside, completely or at least partially, within the memory 516 and/or within the CPU 514 during execution thereof. The memory 516 and the CPU 514 also can constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding or carrying a set of instructions 520 for execution that cause the controller 100 to perform any one or more of the methodologies of the present disclosure. As will be appreciated by those skilled in the art, the method for robot control, haptic control, and transformation of force vectors described herein can be performed in controller 100, or at other processing entities provided at the UGV, in the actuator 40, or in the robot arm.

Data link 200 can include any type of wired or wireless transceiver suitable for communicating data to and from a similar data link (not shown) provided in the UGV 3. If data link 200 is a wireless device, the wireless interface can be based on any of a variety of well known wireless interface standards. Examples of such well known wireless interface standards can include the Bluetooth wireless standard, and the IEEE 802.11 family of standards. However, the invention is not limited in this regard and any other wireless interface standard can be used. Data communicated over the data link can include motion control commands directed to actuator 40, and feedback data communicated from actuator 40 to the controller 100. The data link can include transmitter circuitry 506, receiver circuitry 508, a receive/transmit switch 504, and antenna 502. Communications paths 536, 534 can facilitate data transfer between the data link 200 and the controller 100.

All of the apparatus, methods and algorithms disclosed and claimed herein can be made and executed without undue experimentation in light of the present disclosure. While the invention has been described in terms of preferred embodiments, it will be apparent to those of skill in the art that variations can be applied to the apparatus, methods and sequence of steps of the method without departing from the concept, spirit and scope of the invention. More specifically, it will be apparent that certain components can be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for sensing a force experienced by a robotic grasping device, the method comprising:
    applying an actuator force at a proximal end of at least one of an elongated first and second robot finger to reduce a space between opposing first and second gripping surfaces disposed adjacent to a respective distal end of the first and second robot fingers;
    sensing a first operative force applied to said first robot finger using a first force sensor located on a portion of a finger base of the first robot finger that is disposed within an internal cavity structure formed in a finger gripper so as to be fully covered by the cavity structure; and
    preventing contact between the portion of the finger base and the interior surface of the cavity structure when the finger base flexes due to the first operative force by providing an air gap between the interior surface of the cavity structure and the portion of the finger base.

2. The method according to claim 1, wherein said sensing step comprises measuring said first operative force with respect to at least three spatial directions.

3. The method according to claim 2, further comprising defining said spatial directions with respect to a coordinate system that is at least partially defined with respect to a linear axis substantially aligned with an elongated length of said first robot finger.

4. The method according to claim 1, further comprising sensing a second operative force applied to said second robot finger using a second force sensor disposed on the second robot finger between the proximal end and the distal end, exclusive of the second gripping surface.

5. The method according to claim 4, further comprising sensing said first and second operative force with respect to at least three spatial directions.

6. The method according to claim 5, further comprising sensing said first operative force with respect to a first coordinate system defined with respect to a linear axis substantially aligned with an elongated length of said first robot finger, and said second operative force with respect to a different second coordinate system defined with respect to a linear axis substantially aligned with an elongated length of said second robot finger.

7. The method according to claim 5, further comprising using data representing said first and said second operative force to determine a gripping force applied by said robotic grasping device to an object.

8. The method according to claim 7, further comprising using said gripping force to generate a haptic feedback control signal for producing a haptic response at a user interface.

9. The method according to claim 6, further comprising translating said first operative force of said first coordinate system and said second operative force of said second coordinate system, to a common third coordinate system to calculate a contact force on said robotic arm.

10. The method according to claim 9, further comprising defining said third coordinate system to include one axis aligned with an elongated length of said robotic arm.

11. The method according to claim 9, further comprising using said contact force to generate a haptic feedback control signal for producing a haptic response at a user interface.

12. A system for measuring a force experienced by a robotic grasping device, the system comprising:
first and second robot fingers, each having an elongated form, and each having a proximal end at least partially defined by a finger base and a gripping surface of a finger gripper disposed adjacent to a respective distal end thereof;
an actuator coupled to the proximal end of at least one of said first and second robot finger;
at least a first force sensor located on a portion of the finger base of a first robot finger which is disposed within an internal cavity structure formed in a finger gripper so as to be fully covered by the cavity structure;
wherein said actuator is responsive to one or more control signals for applying an actuator force to said proximal end of at least one of said first and second robot finger to reduce a space between opposing first and second gripping surfaces; and
wherein an air gap is provided between an interior surface of the cavity structure and the portion of the finger base such that the portion of the finger base and the interior surface cannot come in contact with one another when the finger base flexes due to said force applied to said robotic grasping device.

13. The system according to claim 12, wherein said first force sensor is configured to sense a first operative force applied to said first robot finger.

14. The system according to claim 13, wherein said first force sensor is configured to sense said first operative force with respect to at least three spatial directions.

15. The system according to claim 14, wherein said spatial directions are determined with respect to a coordinate system that is at least partially defined with respect to a linear axis substantially aligned with an elongated length of said first robot finger.

16. The system according to claim 12, further comprising at least a second force sensor disposed on said second robot finger between the proximal end and the distal end, exclusive of the gripping surface.

17. The system according to claim 16, wherein said first force sensor and said second force sensor are respectively configured to sense a first and second operative force applied respectively to said first and second robot finger.

18. The system according to claim 17, further comprising measuring each of said first and second operative force with respect to at least three spatial directions.

19. The system according to claim 18, wherein said first force sensor is configured to sense said first operative force with respect to a first coordinate system defined with respect to a linear axis substantially aligned with an elongated length of said first finger, and said second force sensor is configured to sense said second operative force with respect to a different, second coordinate system defined with respect to a linear axis substantially aligned with an elongated length of said second finger.

20. The system according to claim 17, further comprising a data processing system configured to determine a gripping force applied by said robotic grasping device to an object based on data representing said first and said second operative force.

21. The system according to claim 20, wherein said data processing system is further configured to use information representing said gripping force to generate a haptic feedback control signal for producing a haptic response at a user interface.

22. The system according to claim 19, further comprising a data processing system configured to translate said first operative force of said first coordinate system and said second operative force of said second coordinate system, to a common third coordinate system to calculate a contact force on said robotic arm.

23. The system according to claim 22, wherein said third coordinate system is defined to include one axis aligned with an elongated length of said robotic arm.

24. The system according to claim 23, wherein said data processing system is configured to use said contact force to generate a haptic feedback control signal for producing a haptic response at a user interface.

* * * * *